United States Patent
Ma et al.

(10) Patent No.: US 11,424,456 B2
(45) Date of Patent: Aug. 23, 2022

(54) MIXED CONDUCTOR, METHOD OF PREPARING THE MIXED CONDUCTOR, AND CATHODE, LITHIUM-AIR BATTERY AND ELECTROCHEMICAL DEVICE EACH INCLUDING THE MIXED CONDUCTOR

(71) Applicant: Samsung Electronics Co., Ltd., Suwon-si (KR)

(72) Inventors: Sangbok Ma, Suwon-si (KR); Hyukjae Kwon, Suwon-si (KR); Hyunpyo Lee, Seoul (KR); Donghwa Seo, Burlington, MA (US); Dongmin Im, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 395 days.

(21) Appl. No.: 16/658,709

(22) Filed: Oct. 21, 2019

(65) Prior Publication Data

US 2020/0136148 A1 Apr. 30, 2020

Related U.S. Application Data

(60) Provisional application No. 62/749,802, filed on Oct. 24, 2018.

(30) Foreign Application Priority Data

Dec. 13, 2018 (KR) .......... 10-2018-0161178

(51) Int. Cl.
*H01M 4/02* (2006.01)
*H01M 4/86* (2006.01)
*H01M 12/08* (2006.01)
*H01M 12/02* (2006.01)
*H01G 11/46* (2013.01)

(52) U.S. Cl.
CPC ......... *H01M 4/8673* (2013.01); *H01M 12/02* (2013.01); *H01M 12/08* (2013.01);
(Continued)

(58) Field of Classification Search
CPC ...................................... H01M 4/02
See application file for complete search history.

(56) References Cited

U.S. PATENT DOCUMENTS

2012/0100440 A1  4/2012  Narula et al.
2016/0020458 A1* 1/2016  Choi ............... H01M 4/525
                                              252/182.1
(Continued)

FOREIGN PATENT DOCUMENTS

CN   105304975 A   2/2016
CN   105742647 A   7/2016
(Continued)

OTHER PUBLICATIONS

"Phase Relationships and Structural and Chemical Stabilities of Charged Li1ÀxCoO2Àd and Li1ÀxNi0.85Co0.15O2Àd Cathodes" 2003 Electrochem. Solid-State Lett. vol. 6, No. 1, pp. A9-A12.*
(Continued)

*Primary Examiner* — Jacob B Marks
(74) *Attorney, Agent, or Firm* — Cantor Colburn LLP

(57) ABSTRACT

A mixed conductor, a method of preparing the same, and a cathode, a lithium-air battery, and an electrochemical device each including the mixed conductor. The mixed conductor is represented by Formula 1 and having electronic conductivity and ionic conductivity:

$$Li_xMO_{2-\delta} \quad \text{Formula 1}$$

wherein, in Formula 1, M is a Group 4 element, a Group 5 element, a Group 6 element, a Group 7 element, a Group 8 element, a Group 10 element, a Group 11 element, a Group 12 element, or a combination thereof, and $0<x<1$ and $0\leq\delta\leq1$ are satisfied.

30 Claims, 4 Drawing Sheets

(52) U.S. Cl.
CPC ..... *H01G 11/46* (2013.01); *H01M 2004/8689* (2013.01); *H01M 2300/0068* (2013.01)

(56) References Cited

U.S. PATENT DOCUMENTS

| | | |
|---|---|---|
| 2016/0064785 A1 | 3/2016 | Kim et al. |
| 2016/0141617 A1 | 5/2016 | Verma et al. |
| 2016/0211517 A1* | 7/2016 | Beck ............... H01M 4/505 |
| 2018/0233745 A1* | 8/2018 | Yura ............... H01M 10/0525 |

FOREIGN PATENT DOCUMENTS

| | | |
|---|---|---|
| JP | 2013-254647 A | 12/2013 |
| JP | 2017-0176612 A | 4/2017 |
| WO | 2011038773 A1 | 4/2011 |

OTHER PUBLICATIONS

Emery et al., "Data Descriptor: High-throughput DFT calculations of formation energy, stability and oxygen vacancy formation energy of ABO3 perovskites", Scientific Data, Nature, 2017, 153.

Ensling et al., "Nonrigid Band Behavior of the Electronic Structure of LiCoO2 Thin Film during Electrochemical Li Deintercalation", Chemistry of Materials, 26, 2014, 3948-3956.

Kang et al., "Electrodes with High Power and High Capacity for Rechargeable Lithium Batteries", Science, vol. 311, Feb. 2017, p. 977-980.

Kang et al., "Factors that affect Li mobility in layered lithium transition metal oxides", Physical Review B 74, 2006, 094105.

\* cited by examiner

MIXED CONDUCTOR, METHOD OF PREPARING THE MIXED CONDUCTOR, AND CATHODE, LITHIUM-AIR BATTERY AND ELECTROCHEMICAL DEVICE EACH INCLUDING THE MIXED CONDUCTOR

CROSS-REFERENCE TO RELATED APPLICATIONS

This application claims priority to and the benefit of U.S. Provisional Application No. 62/749,802, filed on Oct. 24, 2018, in the US Patent and Trademark Office, and Korean Patent Application No. 10-2018-0161178, filed on Dec. 13, 2018, in the Korean Intellectual Property Office, and all the benefits accruing therefrom under 35 U.S.C. § 119, the contents of which are incorporated herein in their entirety by reference.

BACKGROUND

1. Field

The present disclosure relates to a mixed conductor, a method of preparing the mixed conductor, and a cathode, a lithium-air battery, and an electrochemical device, each including the mixed conductor.

2. Description of the Related Art

In a lithium-air battery, lithium itself is used as the anode and it is unnecessary to store air as a cathode active material in the battery, and thus a lithium-air battery may be implemented as a high-capacity battery. In addition, lithium-air batteries have a theoretical specific energy of equal to greater than 3,500 watt hours per kilogram (Wh/kg).

A cathode of a lithium-air battery may be manufactured by mixing cathode materials, such as a conducting agent and a binder. However, these cathode materials may be decomposed, and this may lead to deterioration of a lithium-air battery including such a cathode. Therefore, there is a need for improved materials.

SUMMARY

Provided is a chemically stable mixed conductor and a method of preparing the mixed conductor.

Provided are a cathode having improved stability by inclusion of the mixed conductor, an a lithium-air battery including the cathode.

Provided is an electrochemical device including the mixed conductor.

Additional aspects will be set forth in part in the description which follows and, in part, will be apparent from the description, or may be learned by practice of the presented embodiments.

According to an aspect of an embodiment, there is provided a mixed conductor represented by Formula 1 and having electronic conductivity and ionic conductivity:

$$Li_xMO_{2-\delta}$$  Formula 1 wherein, in Formula 1, M is a Group 4 element, a Group 5 element, a Group 6 element, a Group 7 element, a Group 8 element, a Group 10 element, a Group 11 element, a Group 12 element, or a combination thereof, and $0<x<1$ and $0\leq\delta\leq1$ are satisfied.

According to an aspect of an embodiment, a method of preparing the above-described mixed conductor includes: mixing a lithium compound, an M-containing compound, and a solvent to obtain a mixture; first thermally treating the mixture to obtain a first thermal treatment product; pulverizing the first thermal treatment product to obtain a pulverized product; and second thermally treating the pulverized product to prepare the mixed conductor, wherein M in Formula 1 is a Group 4 element, a Group 5 element, a Group 6 element, a Group 7 element, a Group 8 element, a Group 10 element, a Group 11 element, a Group 12 element, or a combination thereof.

According to an aspect of the disclosure, there is provided a cathode including the mixed conductor, wherein the cathode is configured to use oxygen as a cathode active material.

According to an aspect of the disclosure, there is provided a lithium-air battery including the cathode, an anode including lithium, and an electrolyte between the cathode and the anode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
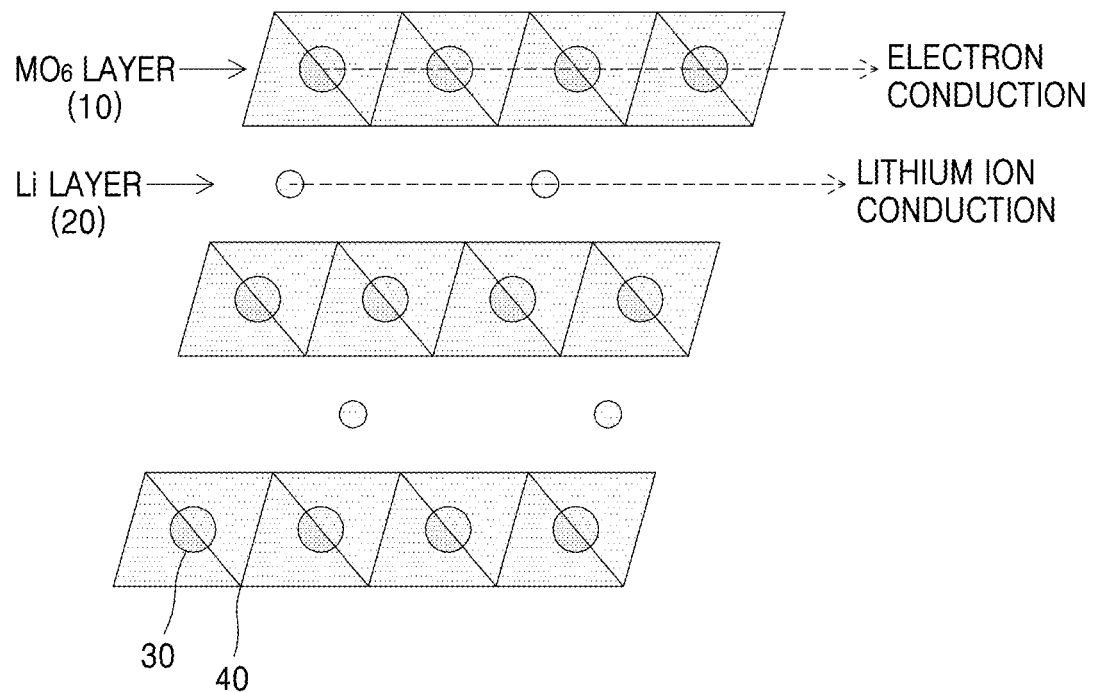
FIG. 1 is a schematic view illustrating an embodiment of a crystal structure of a mixed conductor.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" and "upper," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an embodiment of a mixed conductor, a method of preparing the mixed conductor, a cathode including the mixed conductor, a lithium-air battery including the cathode, and an electrochemical device including the mixed conductor will be described in detail.

While not wanting to be bound by theory, it is understood that a cathode material may be decomposed by a radical generated from an electrochemical reaction during charge and discharge of a lithium-air battery. Disclosed a material having improved stability.

According to an aspect of the disclosure, there is provided a mixed conductor represented by Formula 1 and having electronic conductivity and ionic conductivity.

$$Li_xMO_{2-\delta} \qquad \text{Formula 1}$$

In Formula 1, M is a Group 4 element, a Group 5 element, a Group 6 element, a Group 7 element, a Group 8 element, a Group 10 element, a Group 11 element, a Group 12 element, or a combination thereof, and $0<x<1$, and $0\leq\delta\leq1$ are satisfied, In an aspect, the mixed conductor has an electronic conductivity of about $4\times10^{-9}$ Siemens per centimeter to about $1\times10^{-3}$ Siemens per centimeter at 25° C., and an ionic conductivity of about $1\times10^{-9}$ Siemens per centimeter to about $1\times10^{-4}$ Siemens per centimeter at 25° C.

As used herein, the "mixed conductor" may refer to a conductor providing suitable ionic conductivity and electronic conductivity at the same time.

A conducting agent, a binder, and the like in a cathode of a lithium-air battery may be decomposed by a radical that may be generated from an electrochemical reaction during charge and discharge of the lithium-air battery, leading to deterioration of the lithium-air battery including the cathode. Accordingly, there is a need for a cathode material with improved stability, which is stable in the presence of a radical.

To solve this problem, the inventors disclose a mixed conductor which is chemically stable and which conducts lithium ions and electrons at the same time, e.g., has electronic conductivity and ionic conductivity suitable for a lithium-air battery. A cathode including the mixed conductor may be inhibited from decomposition caused by a radical that may be generated during an electrochemical reaction, unlike a cathode including a carbonaceous conducting agent. Accordingly, a lithium-air battery including such a cathode may have improved charge and discharge characteristics.

The mixed conductor according to an embodiment may be electrically neutral. The mixed conductor, as a lithium ion conductor including lithium and providing a transfer path of lithium ions, e.g., due to having a crystalline morphology, may have improved ionic conductivity by selection of the amount of lithium contained in the mixed conductor. The mixed conductor may have improved electronic conductivity by selection of the oxidation number of a transition metal. The oxidation number of the transition metal may be a mixed oxidation number. The transition metal may have a mixed oxidation number, e.g., a mixed oxidation state.

In Formula 1, M may be cobalt (Co), nickel (Ni), iron (Fe), manganese (Mn), vanadium (V), titanium (Ti), chromium (Cr), copper (Cu), zinc (Zn), or a combination thereof. For example, M may be cobalt (Co), nickel (Ni), manganese (Mn), or chromium (Cr).

In Formula 1, x may be from about 0.1 to about 0.9, for example, from about 0.2 to about 0.9, for example, from about 0.3 to about 0.7, for example, from about 0.4 to about 0.6, or for example, from about 0.3 to about 0.5.

The relationship between the lithium ion conductivity and the activation energy of an element may be represented by the following Equation 1.

$$\sigma(Li^+) = \left(\frac{C_{eff}}{kT}\right)(D_0 e^{-E_b/kT})$$  Equation 1

In Equation 1, $\sigma(Li^+)$ is the Li ion conductivity, $C_{eff}$ is the effective concentration, k is the Boltzmann constant, T is the temperature in Kelvin, $D_0$ is the diffusivity, and $E_b$ is the activation energy barrier.

As shown in Equation 1, use of an element having a decreased activation energy may provide an increased ionic conductivity. Examples of such an element are cobalt, nickel, manganese, and chromium. Accordingly, when M in Formula 1 is, for example, cobalt, nickel, manganese, chromium, or a combination thereof, the mixed conductor may have improved ionic conductivity characteristics.

In an embodiment, the mixed conductor may have an oxygen vacancy generation energy of less than 5 electron volts (eV), for example, an oxygen vacancy generation energy of about 0.1 eV to less than 5 eV, or about 0.5 eV to about 4 eV. The "oxygen vacancy generation energy" herein may be determined by quantum computation. The smaller the oxygen vacancy generation energy of the mixed conductor, the easier the formation of an excess electron due to an oxygen vacancy, and the greater the electronic conductivity. To determine the oxygen vacancy generation energy, a quantum computation method, as disclosed in a method similar to that disclosed in Antoine A. Emery and Chris Wolverton, "High-throughput DFT calculations of formation energy, stability and oxygen vacancy formation energy of $ABO_3$ perovskites," Scientific Data 4 (2017) 170153, may be used, the content of which is incorporated herein by reference in its entirety. When an element having a small oxygen vacancy generation energy as described above is used as M in Formula 1, the mixed conductor may have improved electronic conductivity.

The mixed conductor of Formula 1 may be a compound having a layered structure or a layered-like crystal structure, e.g., a layered crystal structure. The compound having such a crystal structure may be represented by Formula 2.

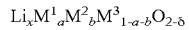

$Li_x M^1_a M^2_b M^3_{1-a-b} O_{2-\delta}$  Formula 2

In Formula 2, $M^1$ may be Ni, Co, Mn, Cr, or a combination thereof, $M^2$ and $M^3$ may each independently be a Group 4 element, a Group 5 element, a Group 8 element, a Group 11 element, a Group 12 element, or a combination thereof, and $0<x<1$, $0<a\leq1$, $0\leq b<1$, and $0\leq\delta\leq1$ are satisfied. In Formula 2, the sum of a and b may be equal to 1. $\delta$ denotes an oxygen vacancy content.

In Formula 2, $M^1$ may be a 3d orbital element. When such an element and lithium are included, the compound of Formula 2 may have a layered crystal structure. In this case, $M^2$ and $M^3$ may each be a doping element.

In Formula 2, x may be from about 0.1 to about 0.9, for example, from about 0.2 to about 0.9, for example, from about 0.3 to about 0.7, for example, from 0.4 to about 0.6, or for example, from about 0.3 to about 0.5.

In Formula 2, a may be from about 0.1 to about 1, for example, a may be 1. For example, in Formula 2, a may be from about 0.3 to about 0.6, for example, about 0.5. In Formula 2, b may be 0 or may be from about 0.1 to about 0.9, for example, from about 0.2 to about 0.9, for example, from about 0.3 to about 0.7, for example, from about 0.4 to about 0.6, or for example, from about 0.3 to about 0.5. In Formula 2, $\delta$ may be 0 or may be greater than 0 and equal to or less than 1.

In an embodiment, the mixed conductor may be $Li_x Co_a O_{2-\delta}$, $Li_x Co_a Ni_{1-a} O_{2-\delta}$, e.g., $Li_x Co_a Ni_b O_{2-\delta}$, $Li_x Co_a Ni_b Mn_{1-a-b} O_{2-\delta}$, $Li_x Ni_a O_{2-\delta}$, $Li_x Mn_a O_{2-\delta}$, $Li_x Cr_a O_{2-\delta}$, $Li_x Co_a Mn_b O_{2-\delta}$, $Li_x Ni_a Mn_b O_{2-\delta}$, $Li_x Cr_a Mn_b O_{2-\delta}$, or a combination thereof, wherein, in each of the foregoing mixed conductors, each x is independently $0<x<1$, for example, x may be from about 0.3 to about 0.5, each a is independently $0<a\leq1$, each b is independently $0\leq b<1$, each $\delta$ is independently $0\leq\delta\leq1$, and $a+b=1$. In the above-listed Formulae, a may be from about 0.1 to about 1, for example, a may be 1. For example, a may be from about 0.3 to about 0.6, for example, about 0.5. For example, b may be 0 or may be from 0.1 to 0.9, for example from about 0.2 to about 0.9, for example, from about 0.3 to about 0.7, for example, from about 0.4 to about 0.6, or for example, from about 0.3 to about 0.5. For example, $\delta$ may be 0, or may be greater than 0 and equal to or less than 1.

In an embodiment, the mixed conductor may be, for example, $Li_{0.5}CoO_{2-\delta}$, $Li_{0.5}Co_{0.5}Ni_{0.5}O_{2-\delta}$, $Li_{0.5}NiO_{2-\delta}$, $Li_{0.5}MnO_{2-\delta}$, $Li_{0.5}CrO_{2-\delta}$, $Li_{0.5}Co_{0.5}Mn_{0.5}O_{2-\delta}$, $Li_{0.5}Ni_{0.5}Mn_{0.5}O_{2-\delta}$, $Li_{0.5}Cr_{0.5}Mn_{0.5}O_{2-\delta}$, $Li_{0.4}CoO_{2-\delta}$, $Li_{0.4}Co_{0.5}Ni_{0.5}O_{2-\delta}$, $Li_{0.4}NiO_{2-\delta}$, $Li_{0.4}MnO_{2-\delta}$, $Li_{0.4}CrO_{2-\delta}$, $Li_{0.4}Co_{0.5}Mn_{0.5}O_{2-\delta}$, $Li_{0.4}Ni_{0.5}Mn_{0.5}O_{2-\delta}$, $Li_{0.4}Cr_{0.5}Mn_{0.5}O_{2-\delta}$, $Li_{0.3}CoO_{2-\delta}$, $Li_{0.3}Co_{0.5}Ni_{0.5}O_{2-\delta}$, $Li_{0.3}NiO_{2-\delta}$, $Li_{0.3}MnO_{2-\delta}$, $Li_{0.3}CrO_{2-\delta}$, $Li_{0.3}Co_{0.5}O_2 O_{2-\delta}$, $Li_{0.3}Ni_{0.5}Mn_{0.5}O_{2-\delta}$, $Li_{0.3}Cr_{0.5}Mn_{0.5}O_{2-\delta}$, $Li_{0.5}Co_{0.4}Ni_{0.6}O_{2-\delta}$, $Li_{0.5}Co_{0.4}Mn_{0.6}O_{2-\delta}$, $Li_{0.5}Ni_{0.4}Mn_{0.6}O_{2-\delta}$, $Li_{0.5}Cr_{0.4}Mn_{0.6}O_{2-\delta}$, $Li_{0.5}Co_{0.3}Ni_{0.7}O_{2-\delta}$, $Li_{0.3}Co_{0.3}Mn_{0.7}O_{2-\delta}$, $Li_{0.5}Ni_{0.3}Mn_{0.7}O_{2-\delta}$, $Li_{0.5}Cr_{0.3}Mn_{0.7}O_{2-\delta}$, $Li_{0.5}Co_{0.2}Ni_{0.8}O_{2-\delta}$, $Li_{0.5}Ni_{0.8}Mn_{0.2}O_{2-\delta}$, $Li_{0.5}Co_{0.1}Ni_{0.9}O_{2-\delta}$, $Li_{0.5}Ni_{0.9}Mn_{0.1}O_{2-\delta}$, $Li_{0.5}Co_{0.6}Ni_{0.4}O_{2-\delta}$, $Li_{0.5}Co_{0.6}Mn_{0.4}O_{2-\delta}$, $Li_{0.5}Ni_{0.6}Mn_{0.4}O_{2-\delta}$, $Li_{0.5}Cr_{0.6}Mn_{0.4}O_{2-\delta}$, or a combination thereof, wherein $0\leq\delta\leq1$, for example, $\delta$ may be 0, or may be greater than 0 and equal to or less than 1.

The mixed conductor of Formula 1 may have a band gap between a valence band and a conduction band of, for example, equal to or less than about 2 eV, or for example, equal to or less than about 1 eV, e.g., about 0.01 eV to about 2 eV, or about 0.2 eV to about 1.8 eV. When the mixed conductor has a small band gap between the valance band and the conduction band within these ranges, migration of electrons from the valence band to the conduction band may be facilitated, and the mixed conductor of Formula 1 may have improved electronic conductivity.

In the mixed conductor of Formula 1, M may be in a mixed valence state with a plurality of different oxidation numbers, e.g., M may have a mixed valence state and include a metal having a plurality of a different oxidation numbers. Accordingly, a new state density function may be added near the Fermi energy (Ef), and the band gap between the valance band and the conduction band may be reduced. As a result, the mixed conductor of Formula 1 may have further improved electronic conductivity.

For example, when M in Formula 1 is cobalt (Co), Co may be, for example, trivalent, tetravalent, or a combination thereof, and for example, may have a mixed oxidation number of +3 and +4. For example, in the mixed conductor of Formula 1, when M is Co in a mixed valence state with two different oxidation numbers of +3 and +4, a new state density function, which may be near the Fermi energy (Ef), may be added, and a reduced band gap between the valence band and the conduction band provided. Accordingly, the mixed conductor of Formula 1 (e.g., where M is Co) may have further improved electronic conductivity.

In the mixed conductor of Formula 1, that M has a mixed oxidation number may be identified by X-ray photoelectron spectroscopy ("XPS"), X-ray absorption spectroscopy, or the like. In the mixed conductor of Formula 1, when M is Co, Co may have a mixed oxidation number of +3 and +4, and the mixed conductor may have improved electronic conductivity due to excess electrons and holes. A mixing ratio of a +3 element and a +4 element may be, for example, from 1:9 to 9:1, for example, from 3:7 to 7:3, or for example, 1:1.

In the mixed conductor of Formula 1 according to an embodiment, M in Formula 1 may further include, in addition to a first metal such as Co, a second metal having an oxidation number different from that of the first metal. For example, when the mixed conductor of Formula 1 further includes an element having an oxidation number different from that of the first metal, an additional, new state density function may be near the Fermi (Ef) energy, and a band gap between the valence band and the conduction band may be reduced.

The mixed conductor of Formula 1 according to an embodiment may provide further improved ionic conductivity by inclusion of an oxygen vacancy. For example, the mixed conductor according to an embodiment may exhibit a state density function shifted near the Fermi energy, due to the inclusion of an oxygen vacancy, and have a reduced band gap between the valence band and the conduction band. As a result, the mixed conductor of Formula 1 may have further improved electronic conductivity.

In an embodiment, the mixed conductor of Formula 1 may have an ionic conductivity at 25° C. of, for example, about $1.0 \times 10^{-9}$ Siemens per centimeter (S/cm) to about $1 \times 10^{-4}$ S/cm, for example, about $1.0 \times 10^{-8}$ S/cm to about $5 \times 10^{-5}$ S/cm, about $5.0 \times 10^{-8}$ S/cm to about $1 \times 10^{-6}$ S/cm, about $2.0 \times 10^{-7}$ S/cm to about $1 \times 10^{-4}$ S/cm, about $1.0 \times 10^{-6}$ S/cm to about $1 \times 10^{-4}$ S/cm, about $5.0 \times 10^{-6}$ S/cm to about $1 \times 10^{-4}$ S/cm, about $1.0 \times 10^{-5}$ S/cm to about $1 \times 10^{-4}$ S/cm, or about $4.0 \times 10^{-5}$ S/cm to about $1 \times 10^{-4}$ S/cm. Since the mixed conductor according to an embodiment has a high ionic conductivity, a cathode and a lithium-air battery each including the mixed conductor according to an embodiment may have further reduced internal resistance.

In an embodiment, the mixed conductor of Formula 1 may have an electronic conductivity of about $4.0 \times 10^{-9}$ S/cm to about $1 \times 10^{-3}$ S/cm, for example, about $1.0 \times 10^{-8}$ S/cm to about $5 \times 10^{-4}$ S/cm, for example, about $5 \times 10^{-8}$ S/cm to about $1.0 \times 10^{-4}$ S/cm, or about $1 \times 10^{-7}$ S/cm to about $3.0 \times 10^{-4}$ S/cm, and an ionic conductivity at 25° C. of about $1.0 \times 10^{-8}$ S/cm to about $1 \times 10^{-4}$ S/cm, for example, about $2.0 \times 10^{-7}$ S/cm to about $5 \times 10^{-5}$ S/cm, or about $2.0 \times 10^{-6}$ S/cm to about $1 \times 10^{-4}$ S/cm. The mixed conductor of Formula 1 according to an embodiment may provide both ionic conductivity and electronic conductivity at the same time, and may be used to implement a cathode without using an additional conducting agent and electrolyte.

The electronic conductivity may be determined by an eddy current method or a kelvin bridge method. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C., the contents of which are incorporated herein by reference in their entirety. Additional details may be determined by one of skill in the art without undue experimentation.

Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989, the content of which is incorporated herein by reference in its entirety.

The mixed conductor according to an embodiment may be electrochemically stable in a voltage range of about 2 V to about 4 V with respect to lithium metal, and may be a lithium ion conductor.

FIG. 1 is a schematic view illustrating a structure of a mixed conductor according to an embodiment. In an aspect, the structure of the mixed conductor comprises a $MO_6$ layer 10 and a lithium layer 20. The $MO_6$ layer 10 comprises corner sharing M-centered oxygen octahedra. In the $MO_6$ layer 10, M 30 are in octahedral coordination by oxygen 40. In an aspect, the mixed conductor can include a layer of M-centered oxygen octahedra.

The mixed conductor according to an embodiment may include a vacancy at a lithium site and allow active conduction of a lithium ion through the vacancy. In the mixed conductor according to an embodiment, and while not wanting to be bound by theory, it is understood that conduction of electrons occurs through a $MO_6$ layer, wherein M of $MO_6$ may be defined the same as described above in connection with Formula 1.

The mixed conductor according to an embodiment may have a phase with a layered structure or a layered-like crystalline structure, which may belong to, for example, a R-3m space group. The atoms in the layered structure-like crystal structure may be arranged, for example, in a cubic close-packed structure ("ccp"). These characteristics may be identified by X-ray diffraction ("XRD") analysis. In an XRD spectrum of the mixed conductor according to an embodiment, two peaks may appear at a diffraction angle of about 65° 2θ to about 67° 2θ, e.g., an X-ray diffraction spectrum of the mixed conductor includes a first peak at a diffraction angle of about 65° 2θ and a second peak at about 67° 2θ, when analyzed using Cu Kα radiation. These peak characteristics support that the mixed conductor according to an embodiment has a layered crystal structure. The two peaks may include a first peak and a second peak, wherein a maximum peak of the first peak may be located in a range of about 65° 2θ to about 66° 2θ, for example, in a range of greater than 65° 2θ to 66° 2θ, for example, in a range of greater than 65° 2θ to less than 66° 2θ, and a maximum peak of the second peak may be located in a range of about 66° 2θ to about 67° 2θ, for example, in a range of greater than 66° 2θ to 67° 2θ, or for example, in a range of greater than 66° 2θ to less than 67° 2θ. The first peak may be associated with, for example, the (108) crystal plane of the mixed conductor, and the second peak may be associated with the (110) crystal plane of the mixed conductor. A height of the second peak may be in a range of about 30% to about 50% of a height of the first peak, for example, may be about 35% to about 45% of the height of the first peak, based on a total height of the first peak.

A full width at half maximum ("FWHM") of the first peak may be about 0.3° 2θ to about 0.7° 2θ, and a FWHM of the second peak may be about 0.2° 2θ to about 0.6° 2θ.

The mixed conductor according to an embodiment may be in the form of a particle. For example, the mixed conductor may have an average particle diameter of about 5 nanometers (nm) to about 500 micrometers (μm), for example, about 100 μm to about 15 μm, for example, about 300 nm to about 10 μm, and a specific surface area of about 0.01 square meters per gram ($m^2/g$) to about 1,000 $m^2/g$, for example, about 0.5 $m^2/g$ to about 100 $m^2/g$.

Hereinafter, a method of preparing the mixed conductor according to an embodiment will be further described.

After a lithium compound, an M-containing compound, and a solvent are mixed together to obtain a mixture, the mixture may be thermally treated (first thermal treatment).

The solvent may be any suitable solvent capable of dissolving or dispersing the lithium compound and the M-containing compound. The solvent may be, for example, ethanol, water, ethylene glycol, isopropanol, or a combination thereof. An amount of the solvent may be about 100 parts to about 1,000 parts by weight, for example, about 300 parts to about 600 parts by weight, each based on 100 parts by weight of a total weight of the lithium compound and the M-containing compound.

The mixing may be performed using, for example, milling, blending, sputtering, or the like. The milling may be performed using a ball mill, an air-jet mill, a bead mill, or a roll mill.

In the first thermal treatment of the mixture, the temperature increase rate may be about 1 degrees Celsius per minute (° C./min) to about 10° C./min, and the first thermal treatment temperature may be in a range of about 400° C. to about 900° C., for example, in a range of about 700° C. to about 900° C. When the temperature increase rate in the first thermal treatment is within this range, the first thermal treatment may be sufficient enough to attain the mixed conductor according to an embodiment having a desired crystalline structure through second thermal treatment, which will be described later.

The first thermal treatment may be performed under an oxidizing gas atmosphere. The oxidizing gas atmosphere may be created with, for example, air or oxygen. The first thermal treatment time may vary depending on the first thermal treatment temperature or the like. The first thermal treatment time may be, for example, in a range of about 1 hour to about 20 hours, for example, in a range of about 1 hour to about 10 hours, or for example, in a range of about 2 hours to about 5 hours.

The lithium compound may be, for example, lithium oxide, lithium carbonate, lithium chloride, lithium sulfide, lithium nitrate, lithium phosphate, lithium hydroxide, or a combination thereof.

The M-containing compound may be, for example, an M-containing oxide, an M-containing carbonate, an M-containing chloride, an M-containing phosphate, an M-containing hydroxide, an M-containing nitrate, an M-containing hydroxide, or a combination thereof. For example, the M-containing compound may be nickel oxide, nickel hydroxide, cobalt oxide, cobalt hydroxide, ruthenium oxide, ruthenium hydroxide, chromium oxide, chromium hydroxide, iridium oxide, iridium hydroxide, manganese oxide, manganese hydroxide, or a combination thereof.

The amounts of the lithium compound and the M-containing compound may be stoichiometrically controlled to attain the mixed conductor of Formula 1 according to an embodiment.

Next, the first thermal treatment product may be pulverized to obtain a formed, e.g., pulverized, product. The formed product may be, for example, in the form of powder particles. The formed product (powder particles) obtained by pulverizing may have a size of equal to or less than about 10 μm. When the pulverized particles have a size within this range, the particles may be small enough to be sufficiently ground and mixed, and may facilitate formation of the layered crystalline phase. As used herein, the term "size" may refer to an average particle diameter when the particles are spherical or may refer to a length of the major axis when the particles are non-spherical. The sizes of the particles may be measured using an electron scanning microscope or a particle size analyzer.

Next, second thermal treatment may be performed on the formed product. In the second thermal treatment of the formed product, the temperature increase rate may be about 1° C./min to about 10° C./min. The second thermal treatment temperature may be in a range of about 400° C. to about 1,000° C., for example, in a range of about 800° C. to about 900° C.

In an embodiment, the second thermal treatment temperature may be greater than the first thermal treatment temperature. Before the second thermal treatment on the formed product, the formed product may be pressed into pellets as described above. When the second thermal treatment is performed on the formed product in pellet form, it may become easier to obtain the target mixed conductor due to a reduced diffusion distance in the material to be thermally treated. When the second thermal treatment is performed on the formed product in powder particles, not the pellets as described above, thought it may be possible to obtain the mixed conductor of Formula 1, a longer thermal treatment time and a greater thermal treatment temperature may be desired, as compared to when the second thermal treatment is performed on the formed product in pellet form.

The conditions of the second thermal treatment may be determined according to an oxidation number of M in Formula 1. For example, the second thermal treatment may be performed, for example, under an oxidizing gas atmosphere, a reducing gas atmosphere, or an inert gas atmosphere. The oxidizing gas atmosphere may be created with, for example, air or oxygen. The reducing gas atmosphere may be created with a reducing gas such as hydrogen. The inert gas atmosphere may be created with an inert gas such as nitrogen, argon, or helium.

The second thermal treatment time may vary depending on the second thermal treatment temperature or the like. The second thermal treatment time may be, for example, in a range of about 1 hour to about 50 hours, or for example, in a range of about 6 hours to about 48 hours.

Through the second thermal treatment, the mixed conductor of Formula 1 may be obtained. When the temperature increase rates in the first thermal treatment and the second thermal treatment are within the above-described ranges, the thermal treatments may be sufficient enough to form a crystalline structure of the mixed conductor of Formula 1, and may also be economical due to a reduced synthesis time.

In an embodiment, the mixed conductor may be used as a cathode material of a lithium-air battery. Since the mixed conductor according to an embodiment may conduct electrons and ions at the same time, it is not necessary to use an additional conducting agent and an electrolyte when the mixed conductor is used as a cathode material.

According to an aspect of the disclosure, there is provided an electrochemical device including the mixed conductor. By inclusion of the mixed conductor, which may be chemically stable and may conduct ions and electrons at the same time, deterioration of the electrochemical device may be efficiently inhibited.

In an embodiment, the electrochemical device may be, for example, a battery, an accumulator, a supercapacitor, a fuel cell, a sensor, or an electrochromic device. However, the disclosed embodiments is not limited thereto. Any suitable electrochemical device may be used.

The battery may be, for example, a primary battery or a secondary battery. The battery may be, for example, a lithium battery, a sodium battery, or the like. However, the disclosed embodiment is not limited thereto, and any suitable battery may be used. The lithium battery may be, for example, a lithium-ion battery or a lithium-air battery. However, the disclosed embodiment is not limited thereto. Any suitable lithium battery device may be used. The electrochromic device may be an electrochemical mirror, a window, or a screen. However, the disclosed embodiment is not limited thereto. Any suitable electrochromic device may be used.

The electrochemical device may be, for example, a lithium-air battery. The lithium-air battery may include a cathode. The cathode may be an air electrode, and may be arranged on a cathode current collector.

The cathode may be, for example, porous. Since the cathode is porous, diffusion of air or oxygen into the cathode may be facilitated.

The cathode may include the mixed conductor according to an embodiment having an electronic conductivity at 25° C. of about $4.0 \times 10^{-9}$ S/cm to about $1 \times 10^{-3}$ S/cm and an ionic conductivity at 25° C. of about $1.0 \times 10^{-6}$ S/cm to about $1 \times 10^{-4}$ S/cm.

According to an aspect of the disclosure, a lithium-air battery may include the cathode according to any of the above-described embodiments, an anode including lithium, and an electrolyte interposed between the cathode and the anode.

By the use of the cathode including a lithium-containing metal oxide as described above, the lithium-air battery may have improved structural stability and deterioration thereof may be suppressed.

In an embodiment, the lithium-air battery may include the cathode according to any of the embodiments, and the cathode may be arranged, for example, on a cathode current collector.

In an embodiment, the cathode may include the mixed conductor. An amount of the mixed conductor may be in a range of about 1 part to about 100 parts by weight, for example, 10 parts to 100 parts by weight, for example, 50 parts to about 100 parts by weight, for example, about 60 parts to about 100 parts by weight, for example, about 80 parts to about 100 parts by weight, or for example, about 90 parts to about 100 parts by weight, each with respect to 100 parts by weight of the cathode. For example, the cathode may substantially consist of the mixed conductor according to any of the embodiments. The cathode may be obtained by sintering, pressing, or a combination thereof the mixed conductor in powder form, and thus may substantially consist of the mixed conductor.

In manufacturing the cathode, pores may be introduced into the cathode by using a pore-forming agent. The cathode may be in the form of porous pellets, a porous sheet, or the like. However, embodiments are not limited thereto. The cathode may have any suitable form depending on a shape of the battery. Since the cathode substantially consists of the mixed conductor, the cathode may have a simple structure, and it may be easy to manufacture the cathode. For example, the cathode may be pervious to gas such as oxygen, air, or the like. Accordingly, the cathode according to an embodiment is distinguished from an existing cathode according to the related art which is substantially impervious to gas such as oxygen, air, or the like and conducts only ions. The cathode according to an embodiment may be porous, pervious to gas, or a combination thereof, and thus oxygen, air, or the like may be diffused into the cathode. In addition, lithium ions, electrons, or a combination thereof may also migrate through the mixed conductor in the cathode. Accordingly, electrochemical reactions by oxygen, lithium ions, and electrons may be facilitated in the cathode.

In an embodiment, in manufacturing the cathode, a conducting agent may be further added, in addition to the mixed conductor, to further improve electronic conductivity and ionic conductivity. For example, the conductive agent may be porous. Due to the porosity of the conductive agent, air permeation may be facilitated. The conductive agent may be any suitable material having porosity, conductivity, or a combination thereof. For example, the conductive agent may be a carbonaceous material having porosity. The carbonaceous material may be, for example, carbon black, graphite, graphene, activated carbon, carbon fiber, or a combination thereof. However, embodiments are not limited thereto. Any suitable carbonaceous material may be used. The conductive agent may be, for example, a metallic material. For example, the metallic material may be metal fibers, metal mesh, metal powder, or the like. The metal powder may be, for example, copper, silver, nickel, or aluminum in powder form. The conductive agent may be, for example, an organic conductive material. The organic conductive material may be, for example, polyphenylene derivatives, polythiophene derivatives, or the like. For example, the above-listed conductive agents may be used alone or in a combination thereof. The cathode according to an embodiment may include a composite conductor as the conductive agent. The cathode according to an embodiment may further include any of the above-listed conductive agents, in addition to the composite conductor.

In an embodiment, the cathode may further include a catalyst for oxidation/reduction of oxygen. Examples of the catalyst may include: precious metal-based catalysts such as platinum, gold, silver, palladium, ruthenium, rhodium, and osmium; oxide-based catalysts such as manganese oxide, iron oxide, cobalt oxide, and nickel oxide; and an organic metal-based catalyst such as cobalt phthalocyanine. However, embodiments are not limited thereto. Any suitable catalyst for oxidation/reduction of oxygen may be used.

In an embodiment, the catalyst may be supported on a catalyst support. The catalyst support may be an oxide support, a zeolite support, a clay-based mineral support, a carbon support, or the like. The oxide support may be a metal oxide support including a metal such as aluminum (Al), silicon (Si), zirconium (Zr), titanium (Ti), cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), tungsten (W), or a combination thereof. Examples of the oxide support may include alumina, silica, zirconium oxide, and titanium dioxide. Examples of the carbon support may include carbon blacks such as Ketjen black, acetylene black, channel black, and lamp black; graphite such as natural graphite, artificial black, and expandable graphite; activated carbons; and carbon fibers. However, embodiments are not limited thereto. Any suitable catalyst support may be used.

In an embodiment, the cathode may further include a binder. For example, the binder may include a thermoplastic resin or a thermocurable resin. For example, the binder may be polyethylene, polypropylene, polytetrafluoroethylene ("PTFE"), polyvinylidene fluoride ("PVdF"), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, or an ethylene-acrylic acid copolymer, which may be used alone or in a combination thereof. However, embodiments are not limited thereto. Any suitable binder may be used.

In an embodiment, the cathode may be manufactured by mixing a conductive agent, a catalyst for oxidation/reduction of oxygen, and a binder together and adding an appropriate solvent thereto to prepare a cathode slurry, and coating the cathode slurry on a surface of a substrate and drying a coated resultant, or optionally compression-molding a dried product to improve an electrode density. For example, the substrate may be a cathode current collector, a separator, or a solid electrolyte membrane. For example, the cathode current collector may be a gas diffusion layer. The conductive agent may be, for example, a composite conductor. For example, the catalyst for oxidation/reduction of oxygen and the binder may be omitted according to a type of the cathode.

In an embodiment, the lithium-air battery may include the cathode anode according to the disclosed embodiment, and the anode may include lithium.

In an embodiment, the anode may be, for example, a lithium metal thin film or a lithium-based alloy thin film. The lithium-based alloy may be, for example, a lithium alloy with, for example, aluminum, tin, magnesium, indium, calcium, titanium, or vanadium.

The lithium-air battery according to an embodiment may include an electrolyte between the cathode and the anode, as described above.

For example, the electrolyte may further include the mixed conductor represented by Formula 1.

For example, the electrolyte may include a solid electrolyte, a gel electrolyte, a liquid electrolyte, or a combination thereof. The solid electrolyte, the gel electrolyte, and the liquid electrolyte are not specifically limited. Any suitable electrolyte may be used.

In an embodiment, the solid electrolyte may include a solid electrolyte including an ionically conducting inorganic material, a solid electrolyte including a polymeric ionic liquid ("PIL") and a lithium salt, a solid electrolyte including an ionically conducting polymer and a lithium salt, a solid electrolyte including an electronically conducting polymer, or a combination thereof. However, embodiments are not limited thereto. Any suitable solid electrolyte may be used.

For example, the ionically conducting inorganic material may include a glass or amorphous metal ion conductor, a ceramic active metal ion conductor, a glass ceramic active metal ion conductor, or a combination thereof. However, embodiments are not limited thereto. Any suitable ionically conducting inorganic material may be used. For example, the ionically conducting inorganic material may be ionically conducting inorganic particles or a formed product thereof, for example, in sheet form.

For example, the ionically conducting inorganic material may be $BaTiO_3$, $Pb(Zr_aTi_{1-a})O_3$ wherein $0 \leq a \leq 1$ ("PZT"), $Pb_{1-x}La_xZr_{1-y}Ti_yO_3$ ("PLZT") (wherein $0 \leq x < 1$ and $0 \leq y < 1$), $Pb(Mg_{1/3}Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (wherein $0 \leq x \leq 1$, $0 \leq y \leq 1$, $0 \leq a \leq 1$, and $0 \leq b \leq 1$), lithium lanthanum titanate ($Li_xLa_yTiO_3$, wherein $0<x<2$, and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$, and $0<y<2$), $SiS_2$-based glass ($Li_xSi_yS_z$, wherein $0<x<3$, $0<y<2$, and $0<z<4$), $P_2S_5$-based glass ($Li_xP_yS_z$, wherein $0<x<3$, $0<y<3$, and $0<z<7$), a $Li_2O$-based ceramic, a LiF-based ceramic, a LiOH-based ceramic, a $Li_2CO_3$-based ceramic, a $LiAlO_2$-based ceramic, a $Li_2O$—$Al_2O_3$—$SiO_2$—$P_2O_5$—$TiO_2$—$GeO_2$-based ceramic, a Garnet-based ceramic ($Li_{3+x}La_3M_2O_{12}$, wherein M=Te, Nb, or Zr), or a combination thereof.

For example, the polymeric ionic liquid ("PIL") may include: i) a cation such as an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof; and ii) an anion such as $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof. For example, the polymeric ionic liquid ("PIL") may be poly(diallyldimethylammonium) bis((trifluoromethanesulfonyl)imide ("TFSI")), poly(1-allyl-3-methylimidazolium bis(trifluoromethanesulfonyl)imide), poly(N-methyl-N-propylpiperidinium bis(trifluoromethanesulfonyl)imide), or the like.

The ionically conducting polymer may include an ion conductive repeating unit such as an ether-based monomer, an acryl-based monomer, a methacryl-based monomer, a siloxane-based monomer, or a combination thereof.

The ionically conducting polymer may include, for example, polyethylene oxide ("PEO"), polyvinyl alcohol ("PVA"), polyvinyl pyrrolidone ("PVP"), polyvinyl sulfone, polypropylene oxide ("PPO"), polymethylmethacrylate, polyethylmethacrylate, polydimethylsiloxane, polyacrylic acid, polymethacrylic acid, poly(methyl acrylate), poly(ethyl acrylate), poly(2-ethylhexyl acrylate), poly(butyl methacrylate), poly(2-ethylhexyl methacrylate), poly(decyl acrylate), polyethylene vinyl acetate, a phosphate ester polymer, polyester sulfide, polyvinylidene fluoride ("PVdF"), or Li-substituted Nafion. However, embodiments are not limited thereto. Any suitable ionically conducting polymer may be used.

The electronically conducting polymer may be, for example, a polyphenylene derivative or a polythiophene derivative. However, embodiments are not limited thereto. Any suitable electronically conducting polymer may be used.

In an embodiment, the gel electrolyte may be obtained, for example, by adding a low-molecular weight solvent to a solid electrolyte interposed between the cathode and the anode. The gel electrolyte may be a gel electrolyte obtained by further adding a low-molecular weight organic compound such as a solvent, an oligomer, or the like to a polymer. The gel electrolyte may be a gel electrolyte obtained by further adding a low-molecular weight organic compound such as a solvent or an oligomer to a suitable polymer electrolyte.

In an embodiment, the liquid electrolyte may include a solvent and a lithium salt. The solvent may include an organic solvent, an ionic liquid ("IL"), an oligomer or a combination thereof. However, embodiments are not limited thereto. Any suitable solvent that is in liquid form at room temperature (25° C.) may be used.

The organic solvent may include, for example, an ether-based solvent, a carbonate-based solvent, an ester-based solvent, a ketone-based solvent or a combination thereof. For example, the organic solvent may include propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether ("DEGDME"), tetraethylene glycol dimethyl ether ("TEGDME"), polyethylene glycol dimethyl ether ("PEGDME", number average molecular weight (Mn)=~500), dimethyl ether, diethyl ether, dibutyl ether, dimethoxyethane, 2-methyltetrahydrofuran, tetrahydrofuran or a combination thereof. However, embodiments are not limited thereto. The organic solvent may be any suitable organic solvent that is in liquid form at room temperature.

The ionic liquid ("IL") may include, for example, i) a cation such as an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof, and ii) an anion such as $BF_4^-$, $PF_6^-$, $AsF_6^-$, $SbF_6^-$, $AlCl_4^-$, $HSO_4^-$, $ClO_4^-$, $CH_3SO_3-$, $CF_3CO_2^-$, $(CF_3SO_2)_2N^-$, $Cl^-$, $Br^-$, $I^-$, $SO_4^-$, $CF_3SO_3-$, $(C_2F_5SO_2)_2N-$, $C_2F_5SO_2)(CF_3SO_2)N-$, $NO_3^-$, $Al_2Cl_7^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

The lithium salt may include lithium bis(trifluoromethanesulfonyl)imide (LiTFSI), $LiPF_6LiBF_4$, $LiAsF_6$, $LiClO_4$, $LiNO_3$, lithium bis(oxalato) borate (LiBOB), $LiCF_3SO_3$, $LiN(SO_2CF_3)_2$, $LiN(SO_2C_2F_5)_2$, $LiN(SO_2F)_2$, $LiC(SO_2CF_3)_3$, $LiN(SO_3CF_3)_2$, $LiC_4F_9SO_3$, $LiAlCl_4$, $CF_3SO_3Li$, or a combination thereof. However, embodiments are not limited thereto. Any suitable lithium salt material may be used. A concentration of the lithium salt may be, for example, about 0.01 molar (M) to about 5.0 M.

In an embodiment, the lithium-air battery may further include a separator between the cathode and the anode. Any suitable separator may be used as long as being durable under operation conditions of the lithium-air battery. For example, the separator may include a polymer non-woven fabric, for example, a non-woven fabric of polypropylene material or a non-woven fabric of polyphenylene sulfide; a porous film of an olefin resin such as polyethylene or polypropylene; or glass fiber. These separators may be used in a combination of at least two thereof.

For example, the electrolyte may have a structure in which a solid polymer electrolyte is impregnated in the separator, or a structure in which a liquid electrolyte is impregnated in the separator. For example, the electrolyte in which a solid polymer electrolyte is impregnated in the separator may be prepared by arranging solid polymer electrolyte films on opposite surfaces of the separator, and roll-pressing them at the same time. For example, the electrolyte in which a liquid electrolyte is impregnated in the separator may be prepared by injecting a liquid electrolyte including a lithium salt into the separator.

In an embodiment, the lithium-air battery may be manufactured by installing the anode on an inner side of a case, sequentially arranging the electrolyte on the anode, the cathode on the electrolyte, and a porous cathode current collector on the cathode, and then arranging a pressing member on the porous cathode current collector to press a resulting cell structure with the pressing member so as to allow air to be transferred to the air electrode (i.e., cathode). The case may be divided into upper and lower portions which contact the anode and the air electrode, respectively. An insulating resin may be disposed between the upper and lower portions of the case to electrically insulate the cathode and the anode from one another.

The lithium-air battery according to any of the embodiments may be used as a lithium primary battery or a lithium secondary battery. The lithium-air battery may have any suitable shape of, for example, a coin, a button, a sheet, a stack, a cylinder, a plane, or a horn. However, embodiments are not limited thereto. The lithium-air battery may be used in a large battery for electric vehicles.

Figure 4:
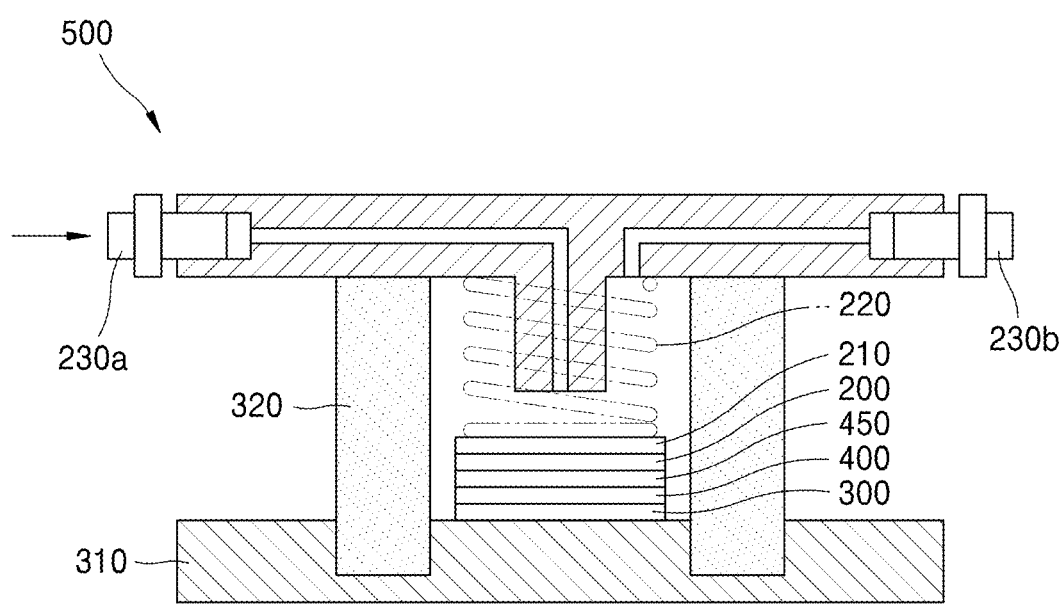
FIG. 4 is a schematic view illustrating an embodiment of a structure of a lithium-air battery.

FIG. 4 is a schematic view illustrating a structure of a lithium-air battery 500 according to an embodiment.

Referring to FIG. 4, the lithium-air battery 500 according to an embodiment may include a cathode 200 adjacent to a first current collector 210 and using oxygen as an active material, an anode 300 adjacent to a second current collector 310 and including lithium, and an first electrolyte 400 interposed between the cathode 200 and the anode 300. The first electrolyte 400 may be a separator impregnated with a liquid electrolyte.

A second electrolyte 450 may be arranged between the cathode 200 and the first electrolyte 400. The second electrolyte 450 may be a lithium-ion conductive solid electrolyte membrane. The first current collector 210 may be porous and function as a gas diffusion layer which allows diffusion of air. A pressing member 220 for transporting air to the cathode 200 may be arranged on the first current collector 210.

A case 320 made of an insulating resin may be disposed between the cathode 200 and the anode 300 to electrically insulate the cathode 200 and the anode 300 from one another. The air may be supplied into the lithium-air battery 500 through an air inlet 230a and may be discharged through an air outlet 230b. The lithium-air battery 500 may be accommodated in a stainless steel container.

The term "air" used herein is not limited to atmospheric air, and for convenience, may refer to a combination of gases including oxygen, or pure oxygen gas. This broad definition of the term "air" also applies to other terms used herein, including "air battery" and "air electrode."

An embodiment of the disclosure will now be described in detail with reference to the following examples. However, these examples are only for illustrative purposes and are not intended to limit the scope of the disclosed embodiment.

EXAMPLES

Preparation Example 1: Preparation of Mixed Conductor $Li_{0.5}CoO_{2-\delta}$ ($0 \leq \delta \leq 1$)

After $Li_2CO_3$ as a lithium precursor and $Co(OH)_2$ as a cobalt precursor were mixed in a stoichiometric ratio according to a composition ratio of $Li_{0.5}CoO_{2-\delta}$ (wherein $0 \leq \delta \leq 1$), ethanol was added thereto, followed by pulverizing and mixing a resulting mixture with a ball mill including zirconia balls at about 280 revolutions per minute (rpm) for about 4 hours. An amount of ethanol was about 4 parts by weight, with respect to 100 parts by weight of a total weight of $Li_2CO_3$ and $Co(OH)_2$.

The mixture was put into a ball mill, and then pulverized and mixed for about 4 hours. The resulting mixture was dried at about 90° C. for about 6 hours, heated at a rate of about 5 degrees Celsius per minute (° C./min) to about 800° C., and then subjected to first thermal treatment at the same temperature under an air atmosphere for about 4 hours.

A first thermal treatment product was pulverized using a ball mill to obtain powder having a primary particle size of about 0.3 micrometers (μm). This powder was pressed under an isostatic pressure to thereby prepare cylindrical pellets having a diameter of about 1.3 centimeters (cm), a height of about 0.5 cm, and a weight of about 0.5 grams (g). The prepared pellets were subjected to second thermal treatment at about 800° C. under an air atmosphere for about 24 hours to thereby prepare a mixed conductor ($Li_{0.5}CoO_{2-\delta}$, wherein $0 \leq \delta \leq 1$). To perform the second thermal treatment, the temperature was increased at a rate of about 5° C./min. In the mixed conductor represented by $Li_{0.5}CoO_{2-\delta}$, $\delta$ may be 0 or may satisfy $0 < \delta \leq 1$, or may be a combination thereof.

Preparation Example 2: Preparation of Mixed Conductor $Li_{0.5}Co_{0.5}Ni_{0.5}O_{2-\delta}$ ($0 \leq \delta \leq 1$)

A mixed conductor represented by $Li_{0.5}Co_{0.5}Ni_{0.5}O_{2-\delta}$ (wherein $0 \leq \delta \leq 1$) was prepared in the same manner as in Preparation Example 1, except that $Ni(OH)_2$ was used as a nickel precursor, and the amounts of the cobalt precursor and the nickel precursor were stoichiometrically varied to attain the target product represented by $Li_{0.5}Co_{0.5}Ni_{0.5}O_{2-\delta}$ (wherein $0 \leq \delta \leq 1$). In the mixed conductor represented by $Li_{0.5}Co_{0.5}Ni_{0.5}O_{2-\delta}$, $\delta$ may be 0, or may satisfy $0 < \delta \leq 1$ or a combination thereof.

Preparation Example 3: Preparation of Mixed Conductor $Li_{0.5}NiO_{2-\delta}$ ($0 \leq \delta \leq 1$)

A mixed conductor represented by $Li_{0.5}NiO_{2-\delta}$ (wherein $0 \leq \delta \leq 1$) was prepared in the same manner as in Preparation Example 1, except that nickel hydroxide ($Ni(OH)_2$) as a nickel precursor was used instead of the cobalt precursor $Co(OH)_2$. In the mixed conductor represented by $Li_{0.5}NiO_{2-\delta}$, $\delta$ may be 0, or may satisfy $0 < \delta \leq 1$ or a combination thereof.

Preparation Example 4: Preparation of Mixed Conductor $Li_{0.5}MnO_{2-\delta}$ ($0 \leq \delta \leq 1$)

A mixed conductor represented by $Li_{0.5}MnO_{2-\delta}$ (wherein $0 \leq \delta \leq 1$) was prepared in the same manner as in Preparation Example 1, except that manganese hydroxide ($Mn(OH)_2$) as a manganese precursor was used instead of the cobalt precursor $Co(OH)_2$. In the mixed conductor represented by $Li_{0.5}MnO_{2-\delta}$, $\delta$ may be 0, or may satisfy $0 < \delta \leq 1$ or a combination thereof.

Preparation Example 5: Preparation of Mixed Conductor $Li_{0.5}CrO_{2-\delta}$ ($0 \leq \delta \leq 1$)

A mixed conductor represented by $Li_{0.5}CrO_{2-\delta}$ (wherein $0 \leq \delta \leq 1$) was prepared in the same manner as in Preparation Example 1, except that chromium oxide ($Cr_2O_3$) as a chromium precursor was used instead of the cobalt precursor $Co(OH)_2$. In the mixed conductor represented by $Li_{0.5}CrO_{2-\delta}$, $\delta$ may be 0, or may satisfy $0 < \delta \leq 1$ or a combination thereof.

Preparation Example 6: Preparation of Mixed Conductor $Li_{0.5}Co_{0.5}Mn_{0.5}O_{2-\delta}$ ($0 \leq \delta \leq 1$)

A mixed conductor represented by $Li_{0.5}Co_{0.5}Mn_{0.5}O_{2-\delta}$ (wherein $0 \leq \delta \leq 1$) was prepared in the same manner as in Preparation Example 1, except that the cobalt precursor $Co(OH)_2$ and manganese hydroxide ($Mn(OH)_2$) as a manganese precursor were used together, instead of the cobalt precursor $Co(OH)_2$ alone. In the mixed conductor represented by $Li_{0.5}Co_{0.5}Mn_{0.5}O_{2-\delta}$, $\delta$ may be 0, or may satisfy $0 < \delta \leq 1$ or a combination thereof.

Preparation Example 7: Preparation of Mixed Conductor $Li_{0.5}Ni_{0.5}Mn_{0.5}O_{2-\delta}$ ($0 \leq \delta \leq 1$)

A mixed conductor represented by $Li_{0.5}Ni_{0.5}Mn_{0.5}O_{2-\delta}$ (wherein $0 \leq \delta \leq 1$) was prepared in the same manner as in Preparation Example 1, except that nickel hydroxide ($Ni(OH)_2$) as a nickel precursor and manganese hydroxide ($Mn(OH)_2$) as a manganese precursor were used together, instead of the cobalt precursor $Co(OH)_2$ alone. In the mixed conductor represented by $Li_{0.5}Ni_{0.5}Mn_{0.5}O_{2-\delta}$, $\delta$ may be 0, or may satisfy $0 < \delta \leq 1$ or a combination thereof.

Preparation Example 8: Preparation of Mixed Conductor $Li_{0.5}Cr_{0.5}Mn_{0.5}O_{2-\delta}$ ($0 \leq \delta \leq 1$)

A mixed conductor represented by $Li_{0.5}Cr_{0.5}Mn_{0.5}O_{2-\delta}$ (wherein ($0 \leq \delta \leq 1$)) was prepared in the same manner as in Preparation Example 1, except that chromium oxide ($Cr_2O_3$) as a chromium precursor and manganese hydroxide ($Mn(OH)_2$) as a manganese precursor were used together, instead of the cobalt precursor $Co(OH)_2$ alone. In the mixed conductor represented by $Li_{0.5}Cr_{0.5}Mn_{0.5}O_{2-\delta}$, $\delta$ may be 0, or may satisfy $0 < \delta \leq 1$ or a combination thereof.

Comparative Preparation Example 1: $Li_4Ti_5O_{12}$

Commercially purchased $Li_4Ti_5O_{12}$ powder was pressed under an isostatic pressure, as described in Preparation Example 1, to thereby prepare pellets.

Example 1: Manufacture of Cathode

After pulverizing the mixed conductor prepared according to Preparation Example 1, the obtained powder was thermally treated at about 800° C. under an air atmosphere for about 60 minutes to thereby manufacture a cathode having a weight per unit area of about 3 milligrams per square centimeter (mg/cm$^2$) or a thickness of about 10 μm.

The manufactured cathode was a porous cathode including about 20 volume percent (vol %) of pores based on a total volume of the cathode.

Examples 2 to 8: Manufacture of Cathode

Cathodes were manufactured in the same manner as in Example 1, except that the mixed conductors of Preparation Examples 2 to 8 were used, respectively, instead of the mixed conductor of Preparation Example 1.

Manufacture Example 1: Manufacture of Lithium-Air Battery (Cathode/LATP/PEO/Li anode)

A lithium aluminum titanium phosphate ("LATP") membrane (having a thickness of about 250 μm, available from Ohara Corp., Japan) as a solid electrolyte membrane was disposed on a lower surface of the cathode manufactured in Example 1, and then sintered at about 800° C. for about 60 minutes to thereby prepare a laminate of the cathode and the solid electrolyte membrane.

Then, a solid electrolyte as an anode intermediate layer was disposed on the solid electrolyte membrane. The solid electrolyte was prepared by mixing polyethylene oxide (weight average molecular weight (Mn)=10,000 Daltons) and lithium bis(trifluoromethylsulfonyl)imide ("LiTFSI") as a lithium salt were mixed in a 20:1 molar ratio of ethylene oxide ("EO") to Li.

A lithium metal foil was arranged on a lower surface of the polymer electrolyte, and a gas diffusion layer ("GDL", 25BC, available from SGL) was arranged on an upper surface of the cathode. A nickel mesh was arranged on the gas diffusion layer, and then pressed and fixed with a pressing member to allow transfer of air to the cathode, to thereby manufacture a lithium-air battery.

Manufacture Examples 2-8: Manufacture of Lithium-Air Battery

Lithium-air batteries were manufactured in the same manner as in Manufacture Example 1, except that the cathodes of Examples 2 to 8 were used, respectively, instead of the cathode of Example 1.

Evaluation Example 1: Evaluation of Electronic Conductivity

Ion-blocking cells were manufactured by sputtering gold (Au) onto opposite surfaces of each of the pellets prepared in Preparation Examples 1 and 2 and Comparative Preparation Example 1, and then electronic conductivities of the ion-blocking cells were measured using a direct current ("DC") polarization method.

While applying a constant voltage of about 100 millivolts (mV) to each of the completed symmetric cells for about 30 minutes, a time-dependent current of the cell was measured. An electronic resistance of each of the mixed conductors was calculated from the measured current, and an electronic conductivity was calculated from the calculated electronic resistance. The obtained electronic conductivities are shown in Table 1.

Evaluation Example 2: Evaluation of Ionic Conductivity

Electron-blocking cells were manufactured by arranging liquid electrolyte (1 molar (M) LiTFSI in propylene carbonate ("PC"))-impregnated separator membranes on opposite surfaces of each of the pellets prepared in Preparation Examples 1 and 2 and Comparative Preparation Example 1, and then lithium foils thereon, and then ionic conductivities of the electron-blocking cells were measured using a DC polarization method.

While applying a constant voltage of about 100 mV to each of the completed symmetric cells for about 30 minutes, a time-dependent current of the cell was measured. An ionic resistance of each of the mixed conductors was calculated from the measured current, and an ionic conductivity was calculated from the calculated ionic resistance. The obtained ionic conductivities are shown in Table 1. For comparison with the electronic conductivities and ionic conductivities of the mixed conductors of Preparation Example 1 and Preparation Example 2, an electronic conductivity and an ionic conductivity) of $LiCoO_2$ (Reference Example 1) are shown in Table 1.

TABLE 1

| Example | Composition | Electronic conductivity (S/cm) | Ionic conductivity (S/cm) |
| --- | --- | --- | --- |
| Preparation Example 1 | $Li_{0.5}CoO_{2-\delta}$ | $1.4 \times 10^{-3}$ | $4.7 \times 10^{-5}$ |
| Preparation Example 2 | $Li_{0.5}Co_{0.5}Ni_{0.5}O_{2-\delta}$ | $3.5 \times 10^{-4}$ | $2.0 \times 10^{-7}$ |
| Comparative Preparation Example 1 | $Li_4Ti_5O_{12}$ | $4.3 \times 10^{-9}$ | $6.8 \times 10^{-8}$ |
| Reference Example 1 | $LiCoO_2$ | $1.2 \times 10^{-9}$ | $4.1 \times 10^{-5}$ |

Referring to Table 1, the mixed conductors of Preparation Examples 1 and 2 were found to be significantly improved both in electronic conductivity and ionic conductivity, as compared with that of Comparative Preparation Example 1.

The mixed conductors of Preparation Examples 1 and 2 were each found to have an electronic conductivity greater than an ionic conductivity. Reportedly, $Li_4Ti_5O_{12-\delta}$ with an oxygen vacancy may have a reduced ionic conductivity, as compared with $Li_4Ti_5O_{12}$ (see Table 5, US 2016/0141617). Unlike $Li_4Ti_5O_{12}$, regardless of the introduction of an oxygen vacancy, the mixed conductors of Preparation Examples 1 and 2 were found to have significantly improved ionic conductivities, as compared with $Li_4Ti_5O_{12}$.

As shown in Table 1, the mixed conductors of Preparation Examples 1 and 2 were found to be remarkably improved in electronic conductivity as compared with $LiCoO_2$ of Reference Example 1, and the mixed conductors of Preparation Examples 1 and 2 has electronic conductivity and ionic conductivity at the same time.

Evaluation Example 3: X-ray Diffraction ("XRD") Evaluation

X-ray diffraction ("XRD") spectra of the mixed conductors of Preparation Examples 1 and 2 were analyzed. The results are shown in FIG. 1. The XRD spectra were obtained with Cu Kα radiation using a Bruker D8 Advance diffractometer.

Figure 2A:
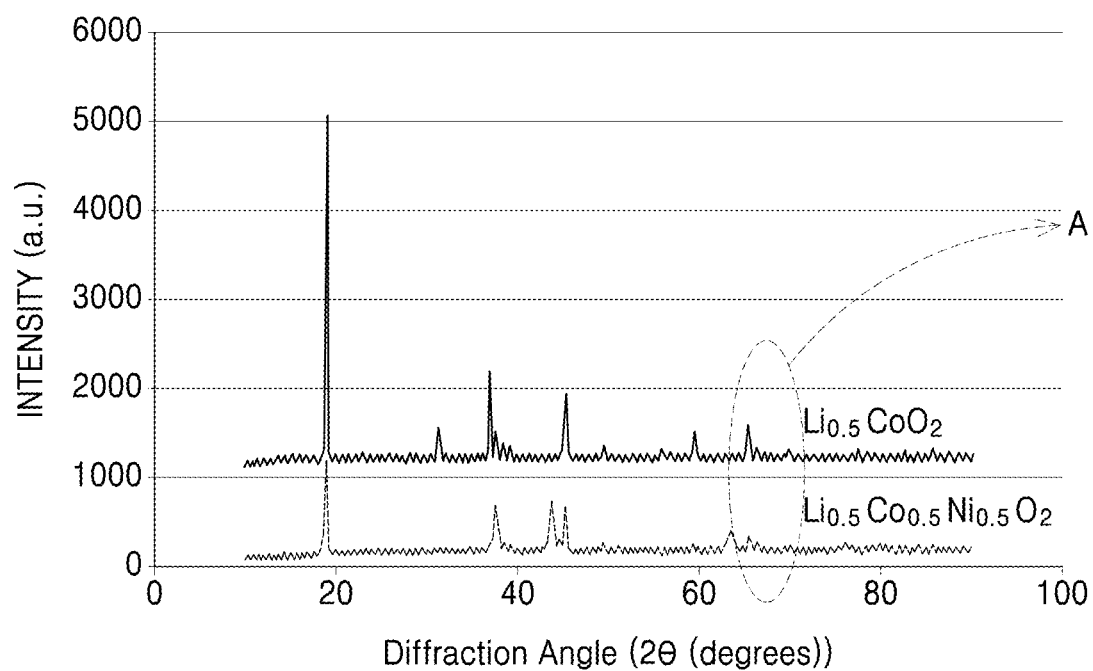
FIG. 2A is a graph of intensity (arbitrary units (a.u.)) versus diffraction angle (degrees 2θ) illustrating X-ray diffraction ("XRD") spectra of mixed conductors of Preparation Examples 1 and 2.
Figure 2B:
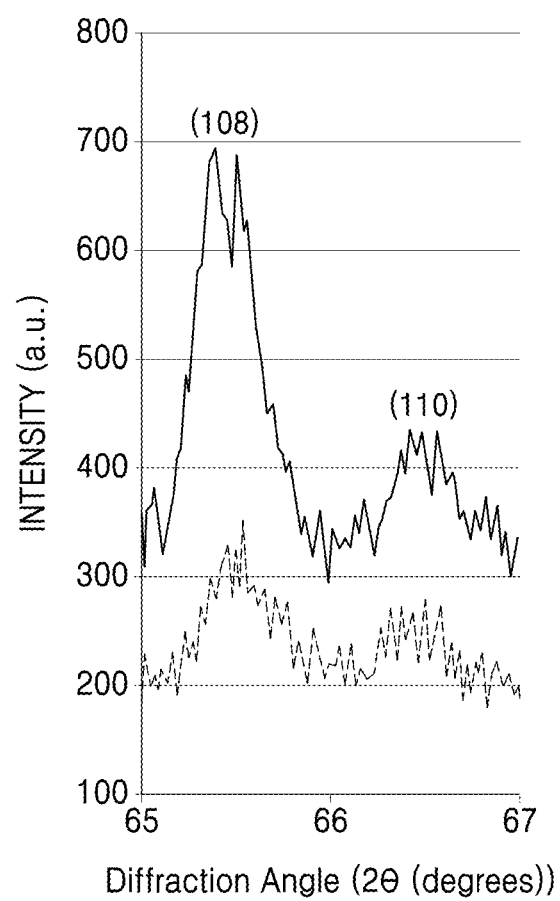
FIG. 2B is a graph of intensity ((a.u.)) versus diffraction angle (degrees 2θ) illustrating a magnified region A of the XRD spectra of FIG. 2A.

The analysis results of the XRD spectra are shown in FIGS. 2A and 2B. FIG. 2B illustrates a magnified region of the XRD spectra of FIG. 2A.

Referring to FIG. 2A, the mixed conductors of Preparation Examples 1 and 2 each exhibited a peak corresponding to a layered crystalline structure.

Referring to FIG. 2B, in the mixed conductor of Preparation Example 1, an intensity of a second peak corresponding to the (110) crystal plane was found to be about 30% less than that of a first peak corresponding to the (108) crystal plane. In the mixed conductor of Preparation Example 2, an intensity of a second peak corresponding to the (110) crystal plane was found to be about 50% less than that of a first peak corresponding to the (108) crystal plane.

Evaluation Example 4: Evaluation of Electrochemical Stability

After the mixed conductor of Preparation Example 1 and the mixed conductor of Preparation Example 2 were each pulverized to a size of about 1 μm, about 85 weight percent (wt %) of each mixed conductor, about 10 wt % of carbon black as a conducting agent, and about 5 wt % of polyvinylidene fluoride ("PVDF") as a binder were mixed with N-methyl-2-pyrrolidone to prepare a slurry. The prepared slurry was coated on an aluminum foil and then dried to thereby manufacture a working electrode. A separator impregnated with a liquid electrolyte (1 M LiTFSI in propylene carbonate ("PC") was arranged between the working electrode and a lithium metal foil used as a counter electrode to thereby complete the manufacture of a half cell.

Each of the half cells was analyzed by cyclic voltammetry ("CV") at a scan rate of about 0.1 millivolts per second (mV/sec) in a voltage range of about 2 volts (V) to about 4 V (with respect to Li/Li$^+$) to evaluate electrochemical stability of the mixed conductor on the lithium metal.

As a result, the mixed conductors of Preparation Example 1 and Preparation Example 2 were found to be electrochemically stable without an overcurrent caused by a side reaction, during a single scan, 80 scans, or 100 scans.

Evaluation Example 5: Evaluation of Charge-Discharge Characteristics of Lithium-Air Battery The lithium-air battery manufactured in Manufacture Example 1 was subjected to a charge-discharge cycle of discharging at about 60° C. under an oxygen atmosphere of about 1 atmosphere (atm) with a constant current of about 0.01 milliamperes per square centimeter (mA/cm$^2$) until a voltage reached 2.0 V (with respect to Li) and then charging with a constant current until a voltage reached 4.25 V. The results of the charge-discharge test at the 1$^{st}$ cycle of the lithium-air battery are shown in FIG. 3.

Figure 3:
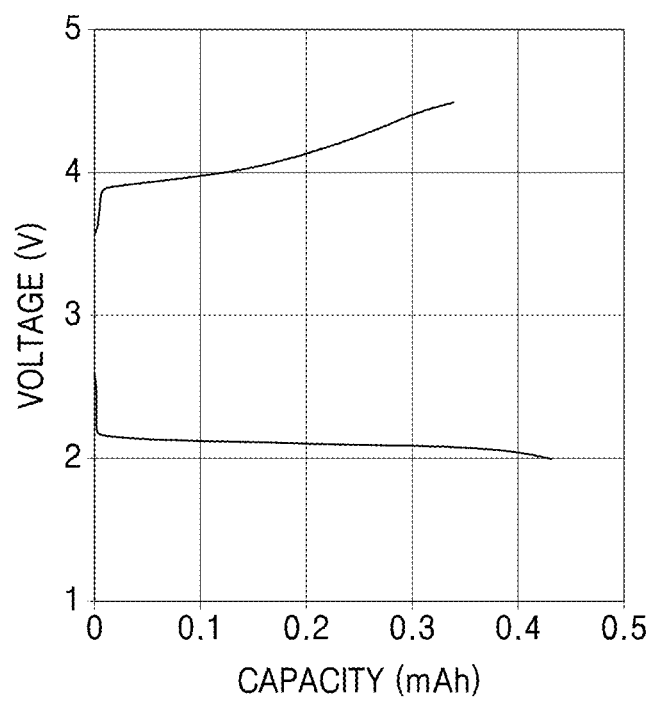
FIG. 3 is a graph of voltage (volts (V)) versus capacity (milliampere-hours (mAh)) illustrating charge and discharge characteristics of a lithium-air battery of Manufacture Example 1.

Referring to FIG. 3, the lithium-air battery of Manufacture Example 1 using the cathode including the mixed conductor of Preparation Example 1 was found to stably operate. Charge and discharge characteristics of the lithium-air batteries of Manufacture Examples 2 to 8 were evaluated in the same manner as applied to the lithium-air battery of Manufacture Example 1.

As a result of the charge and discharge characteristics analysis, charge and discharge characteristics of the lithium-air batteries of Manufacture Examples 2 to 8 were found to be similar to those of the lithium-air battery of Manufacture Example 1.

As described above, according to an embodiment, a mixed conductor represented by Formula 1 may be chemically stable and may transfer both ions and electrons. By using the mixed conductor, an electrochemical device having improved chemical stability and thus suppressed deterioration may be manufactured.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A cathode comprising a mixed conductor represented by Formula 1 and having electronic conductivity and ionic conductivity:

$$Li_xMO_{2-\delta} \quad \text{Formula 1}$$

wherein, in Formula 1, M is a Group 4 element, a Group 5 element, a Group 6 element, a Group 7 element, a Group 8 element, a Group 10 element, a Group 11 element, a Group 12 element, or a combination thereof, and $0<x<1$ and $0\leq\delta\leq1$ are satisfied, wherein the cathode is configured to use oxygen as a cathode active material.

2. The cathode comprising the mixed conductor of claim 1, wherein M is cobalt, nickel, iron, manganese, vanadium, titanium, chromium, copper, zinc, or a combination thereof.

3. The cathode comprising the mixed conductor of claim 1, wherein, in Formula 1, x is from about 0.3 to about 0.5.

4. The cathode comprising the mixed conductor of claim 1, wherein the mixed conductor comprises a phase having a layered crystal structure.

5. The cathode comprising the mixed conductor of claim 4, wherein the mixed conductor comprises a layer of M-centered oxygen octahedra.

6. The cathode comprising the mixed conductor of claim 1, wherein the mixed conductor is a compound represented by Formula 2:

$$Li_xM^1_aM^2_bM^3_{1-a-b}O_{2-\delta} \quad \text{Formula 2}$$

wherein, in Formula 2, M$^1$ is Ni, Co, Mn, or a combination thereof,

M$^2$ and M$^3$ are each independently a Group 4 element, a Group 5 element, a Group 8 element, a Group 11 element, a Group 12 element, or a combination thereof, and $0<x<1$, $0<a\leq1$, $0<b<1$, and $0\leq\delta\leq1$ are satisfied.

7. The cathode comprising the mixed conductor of claim 6, wherein M$^2$ and M$^3$ are each independently iron, vanadium, titanium, chromium, copper, zinc, or a combination thereof.

8. The cathode comprising the mixed conductor of claim 6, wherein, in Formula 2, a is 1, b is 0, and M$^1$ has a mixed valence state and comprises metals having a plurality of a different oxidation numbers.

9. The cathode comprising the mixed conductor of claim 1, wherein the mixed conductor is $Li_xCo_aO_{2-\delta}$, $Li_xCo_aNi_{1-a}O_{2-\delta}$, $Li_xCo_aNi_bMn_{1-a-b}O_{2-\delta}$, $Li_xNi_aO_{2-\delta}$, $Li_xMn_aO_{2-\delta}$, $Li_xCr_aO_{2-\delta}$, $Li_xCo_aMn_bO_{2-\delta}$, $Li_xNi_aMn_bO_{2-\delta}$, $Li_xCr_aMn_bO_{2-\delta}$, or a combination thereof, and wherein, in each of the foregoing mixed conductors, each x is independently $0<x<1$, each a is independently $0<a\leq1$, each b is independently $0<b<1$, and each δ is independently $0\leq\delta\leq1$.

10. The cathode comprising the mixed conductor of claim 1, wherein, in Formula 1, δ is 0.

11. The cathode comprising the mixed conductor of claim 1, wherein the mixed conductor is $Li_{0.5}CoO_{2-\delta}$, $Li_{0.5}Co_{0.5}Ni_{0.5}O_{2-\delta}$, $Li_{0.5}NiO_{2-\delta}$, $Li_{0.5}MnO_{2-\delta}$, $Li_{0.5}CrO_{2-\delta}$, $Li_{0.5}Co_{0.5}Mn_{0.5}O_{2-\delta}$, $Li_{0.5}Ni_{0.5}Mn_{0.5}O_{2-\delta}$, $Li_{0.5}Cr_{0.5}Mn_{0.5}O_{2-\delta}$, $Li_{0.4}CoO_{2-\delta}$, $Li_{0.4}Co_{0.5}Ni_{0.5}O_{2-\delta}$, $Li_{0.4}NiO_{2-\delta}$, $Li_{0.4}MnO_{2-\delta}$, $Li_{0.4}CrO_{2-\delta}$, $Li_{0.4}Co_{0.5}Mn_{0.5}O_{2-\delta}$, $Li_{0.4}Ni_{0.5}Mn_{0.5}O_{2-\delta}$, $Li_{0.4}Cr_{0.5}Mn_{0.5}O_{2-\delta}$, $Li_{0.3}CoO_{2-\delta}$, $Li_{0.3}Co_{0.5}Ni_{0.5}O_{2-\delta}$, $Li_{0.3}NiO_{2-\delta}$, $Li_{0.3}MnO_{2-\delta}$, $Li_{0.3}CrO_{2-\delta}$, $Li_{0.3}Co_{0.5}Mn_{0.5}O_2O_{2-\delta}$, $Li_{0.3}Ni_{0.5}Mn_{0.5}O_{2-\delta}$, $Li_{0.3}Cr_{0.5}Mn_{0.5}O_{2-\delta}$, $Li_{0.5}Co_{0.4}Ni_{0.6}O_{2-\delta}$, $Li_{0.5}Co_{0.4}Mn_{0.6}O_{2-\delta}$, $Li_{0.5}Ni_{0.4}Mn_{0.6}O_{2-\delta}$, $Li_{0.5}Cr_{0.4}Mn_{0.6}O_{2-\delta}$, $Li_{0.5}Co_{0.3}Ni_{0.7}O_{2-\delta}$, $Li_{0.3}Co_{0.3}Mn_{0.7}O_{2-\delta}$, $Li_{0.5}Ni_{0.3}Mn_{0.7}O_{2-\delta}$, $Li_{0.5}Cr_{0.3}Mn_{0.7}O_{2-\delta}$, $Li_{0.5}Co_{0.2}Ni_{0.8}O_{2-\delta}$, $Li_{0.5}Ni_{0.8}Mn_{0.2}O_{2-\delta}$, $Li_{0.5}Co_{0.1}Ni_{0.9}O_{2-\delta}$, $Li_{0.5}Ni_{0.9}Mn_{0.1}O_{2-\delta}$, $Li_{0.5}Co_{0.6}Ni_{0.4}O_{2-\delta}$, $Li_{0.5}Co_{0.6}Mn_{0.4}O_{2-\delta}$, $Li_{0.5}Ni_{0.6}Mn_{0.4}O_{2-\delta}$, $Li_{0.5}Cr_{0.6}Mn_{0.4}O_{2-\delta}$, or a combination thereof, and $0 \leq \delta \leq 1$ is satisfied.

12. The cathode comprising the mixed conductor of claim 1, wherein an electronic conductivity of the mixed conductor is greater than an ionic conductivity thereof.

13. The cathode comprising the mixed conductor of claim 1, wherein the mixed conductor has an electronic conductivity greater than $4.0 \times 10^{-9}$ Siemens per centimeter at 25° C.

14. The cathode comprising the mixed conductor of claim 1, wherein the mixed conductor has an ionic conductivity of $1.0 \times 10^{-9}$ Siemens per centimeter or greater at 25° C.

15. The cathode comprising the mixed conductor of claim 1, wherein an X-ray diffraction spectrum of the mixed conductor includes a first peak at a diffraction angle of about 65° 2θ and a second peak at 67° 2θ, when analyzed using Cu Kα radiation.

16. The cathode comprising the mixed conductor of claim 15, wherein a maximum of the first peak is located in a range of about 65° 2θ to 66° 2θ, and
a maximum of the second peak is located in a range of about 66° 2θ to about 67° 2θ.

17. The cathode comprising the mixed conductor of claim 15, wherein a height of the second peak is in a range of about 30% to about 50% of a height of the first peak.

18. A method of preparing a cathode comprising the mixed conductor of claim 1, the method comprising:
mixing a lithium compound, an M-containing compound, and a solvent to obtain a mixture;
first thermally treating the mixture to obtain a first thermal treatment product;
pulverizing the first thermal treatment product to obtain a pulverized product; and
second thermally treating the pulverized product to prepare the mixed conductor of claim 1, wherein M in Formula 1 is a Group 4 element, a Group 5 element, a Group 6 element, a Group 7 element, a Group 8 element, a Group 10 element, a Group 11 element, a Group 12 element, or a combination thereof to prepare the cathode comprising the mixed conductor.

19. The method of claim 18, wherein the second thermally treating comprises thermally treating at a temperature which is greater than a temperature of the first thermally treating.

20. The method of claim 18, wherein the first thermally treating comprises treating at a temperature of about 400° C. to about 900° C.

21. The method of claim 18, wherein the second thermally treating comprises treating at a temperature of about 400° C. to about 1,000° C.

22. The method of claim 18, wherein the lithium compound is lithium oxide, lithium carbonate, lithium chloride, lithium sulfide, lithium nitrate, lithium phosphate, lithium hydroxide, or a combination thereof.

23. The method of claim 18, wherein the M-containing compound is an M-containing oxide, an M-containing carbonate, an M-containing chloride, an M-containing phosphate, an M-containing hydroxide, an M-containing nitrate, an M-containing hydroxide, or a combination thereof.

24. The cathode of claim 1, wherein the mixed conductor is neither oxidized nor reduced when in contact with lithium metal at a voltage of about 2 volts to about 4 volts with respect to lithium metal.

25. The cathode of claim 1, wherein the mixed conductor has an electronic conductivity greater than $4.0 \times 10^{-9}$ Siemens per centimeter at 25° C., and an ionic conductivity of about $1.0 \times 10^{-9}$ Siemens per centimeter or greater at 25° C.

26. A lithium-air battery comprising:
the cathode of claim 1;
an anode comprising lithium; and
an electrolyte between the cathode and the anode.

27. The lithium-air battery of claim 26, wherein the electrolyte comprises a solid electrolyte.

28. The lithium-air battery of claim 26, wherein the electrolyte comprises a mixed conductor represented by Formula 1 and having electronic conductivity and ionic conductivity:

$$Li_xMO_{2-\delta} \qquad \text{Formula 1}$$

wherein, in Formula 1, M is a Group 4 element, a Group 5 element, a Group 6 element, a Group 7 element, a Group 8 element, a Group 10 element, a Group 11 element, a Group 12 element, or a combination thereof, and $0 < x < 1$ and $0 \leq \delta \leq 1$ are satisfied.

29. An electrochemical device comprising the cathode of claim 1.

30. The electrochemical device of claim 29, wherein the electrochemical device is a battery, an accumulator, a supercapacitor, a fuel cell, a sensor, or an electrochromic device.

* * * * *